C. S. Houck,
Capstan.
N⁰ 77,191.  Patented Apr. 28, 1868.
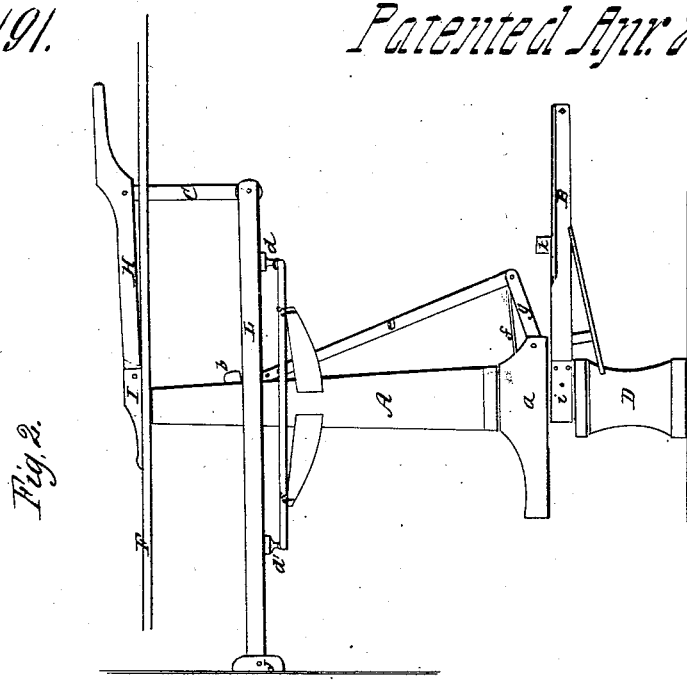
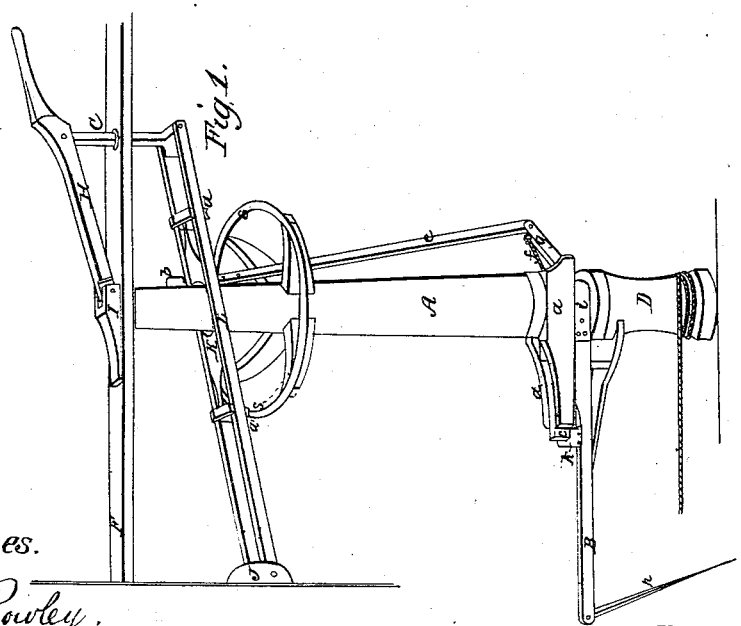
Witnesses.
Edwin Rowley.
Wessel Brewer.
Inventor.
Charles S. Houck.

United States Patent Office.

CHARLES S. HOUCK, OF GREENPORT, NEW YORK.

*Letters Patent No. 77,191, dated April 28, 1868.*

---

IMPROVED CAPSTAN FOR HOISTING-MACHINES.

---

*The Schedule referred to in these Letters Patent and making part of the same.*

---

Be it known that I, CHARLES S. HOUCK, of the town of Greenport, in the county of Columbia, and State of New York, have invented a new and improved Capstan to be used in Operating Hay and other Presses, Hoisting-Machinery, &c.; and I do hereby declare that the following is a full, clear, and exact description of the construction and operation of the same, with its attachments, reference being had to the annexed drawings, making a part of this specification, in which—

Figure 1 is a perspective view, and

Figure 2 a vertical or side elevation.

The nature of my invention consists in providing the ordinary capstan with a lever-frame and brakes near the top of the vertical shaft, so as to be operated on the floor above by the one who fills the box, or any other person, for the purpose of engaging and disengaging the pole or sweep to which the horse or other motive-power is attached, and to regulate the uncoil and descent of the follower and bottom of press.

To enable those skilled in the art to make and use my invention, I will proceed to describe its construction and operation.

I construct my capstan, D, in the usual form, with a vertical shaft, A, of sufficient length to reach the floor, F, which is on a level with the top of the box, (see figs. 1 and 2.) The capstan and shaft are kept in their vertical position by axles or centres at top and bottom. A strap or band, $i$, passes around the neck of the shaft A, just above the capstan D, and is attached to the pole or sweep, B, which allows the capstan and shaft in each uncoil to revolve freely within it, while the pole B, and the horse attached, are standing still. Through the shaft, just above the neck, is a narrow mortise or slot, sufficient only to admit the rod $f$ to pass through and operate the catch-block or slide, $c$, to the heel of which it is attached. This slide $c$ is kept in place and guided by the jaws or side-pieces $a\ a$, which are themselves bolted firmly to opposite sides of the shaft A. The slide-rod $f$ is also connected at its opposite end with the extremity of the short lever $g$ by an eye, in which it moves freely. This short lever or short arm is connected by a movable joint to the long arm or connecting-rod $e$, which, by a similar joint at its upper end, is attached to the sliding block $b$, which slides up and down in a vertical groove in the side of the shaft A. This sliding block has a head, $b$, which sets over the yoke or collar K attached to or placed within the lever-or brake-frame L, so that when the frame is raised and lowered, the sliding block is also raised and lowered accordingly, together with the connecting-rod $e$ and lever $g$, and thus the rod $f$ operates the slide $c$, as may be required, throwing it out to run the follower and press-bottom up, and withdrawing it to uncoil or run them down, in the former engaging the stop-piece or flanch $k$, and in the latter disengaging the same. The uncoiling or backward revolutions of the capstan are also regulated by the brake-blocks $d\ d'$ attached to the lever-frame L, so as to bear on the rim or circle $s\ s$.

The lever-frame is operated by means of the lever-handle H and connecting-bar C, the fulcrum, I, of the handle being attached to the floor.

The operation of this capstan is evident from the foregoing description of its construction. The box of the press being filled with the material to be pressed, the lever-handle H is raised; this raises the yoke or collar K in the frame L, and with it the sliding block $b$, which, being connected with the long arm or connecting-rod $e$, elevates it, and thus, drawing the short arm $g$ closer to the shaft, the rod $f$ shoves forward the slide $c$, so that it comes in contact with the stop-piece or flanch $k$. The horse, being attached to the end of the pole or sweep B, is now started, and the capstan revolving, winds up the rope or chain connected with the levers of the press, thus forcing the follower and press-bottom upward until the material is sufficiently compressed. The bale being secured and removed, the handle H is borne down, so as to disengage the slide $c$ from the stop-piece or flanch $k$, when the shaft and capstan reverse their motion, rapidly or slowly, according to the degree of pressure applied to the lever-handle H, and thus the follower and bottom are run down, and the press is ready to be filled again.

The pointed drag or pike $p$, attached to the back of the pole B, prevents it from flying backward, in case of its connection with the horse or other motive-power being suddenly or unexpectedly severed.

This arrangement is equally useful and applicable for elevating and hoisting purposes.

*Claims.*

What I claim as my invention, and desire to secure by Letters Patent of the United States, is—

1. The combination of lever H, connecting-bar or leg C, lever-frame L, yoke K, slide-block $b$, long arm or connecting-bar $e$, short arm $g$, and rod $f$, or their equivalents, when arranged and employed in the manner or substantially in the manner and for the purpose herein set forth.

2. The combination and arrangement of the lever-frame L, or its equivalent, with the brake-blocks $d\ d'$ and rim or circle $s\ s$, as or substantially as and for the purpose herein described, when located with respect to shaft A and to each other, substantially as described.

CHARLES S. HOUCK.

Witnesses:
   EDWIN ROWLEY,
   WESSEL BREWER.